US012253436B2

(12) United States Patent
Futami et al.

(10) Patent No.: US 12,253,436 B2
(45) Date of Patent: Mar. 18, 2025

(54) METHOD FOR LEAK TESTING

(71) Applicant: FUKUDA CO., LTD., Tokyo (JP)

(72) Inventors: Tomoyuki Futami, Tokyo (JP);
Takaaki Watanabe, Tokyo (JP);
Akimitsu Tanabe, Tokyo (JP)

(73) Assignee: FUKUDA CO., LTD., Tokyo (JP)

( * ) Notice: Subject to any disclaimer, the term of this patent is extended or adjusted under 35 U.S.C. 154(b) by 233 days.

(21) Appl. No.: 18/022,662

(22) PCT Filed: Sep. 9, 2020

(86) PCT No.: PCT/JP2020/034125
§ 371 (c)(1),
(2) Date: Feb. 22, 2023

(87) PCT Pub. No.: WO2022/054169
PCT Pub. Date: Mar. 17, 2022

(65) Prior Publication Data
US 2023/0314267 A1   Oct. 5, 2023

(51) Int. Cl.
G01M 3/20   (2006.01)
(52) U.S. Cl.
CPC ..................... G01M 3/20 (2013.01)
(58) Field of Classification Search
CPC ................ G01M 3/20; G01M 3/229
See application file for complete search history.

(56) References Cited

U.S. PATENT DOCUMENTS

2010/0095745 A1* 4/2010 Flynn .................... G01M 3/207
73/40.7
2014/0222353 A1* 8/2014 Wang .................... G01M 3/229
702/51
2016/0178472 A1   6/2016 Watanabe et al.

FOREIGN PATENT DOCUMENTS

JP   2012-506534 A   3/2012
JP   2014-134513 A   7/2014
(Continued)

OTHER PUBLICATIONS

Japan Patent Office (JPO), International Search Report for corresponding International Application No. PCT/JP2020/034125, dated Dec. 8, 2020.
(Continued)

Primary Examiner — David Z Huang
(74) Attorney, Agent, or Firm — Jodi A. Reynolds, Esq.; Harter Secrest & Emery LLP

(57) ABSTRACT

The present invention provides a method for leak testing by which occurrence of fine leakage from a work as a test object can be determined without being affected by a released tracer gas that is also released from a non-defective work. The method for leak testing includes a series of steps including a gas bombing step wherein a work W as a test object is soaked in a pressurized tracer gas, a work setting step wherein the work subjected to the gas bombing is set in a hermetically sealed container 10, a vacuum suctioning step wherein the hermetically sealed container 10 is vacuum suctioned by a suction device 20 and a measuring step wherein tracer gas measurement data are obtained by measuring a vacuum suctioned tracer gas with a detector 30. Tracer gas measurement data for a non-defective work are preliminarily obtained by performing the series of steps for the non-defective work having same specifications as the work W as the test object. The tracer gas measurement data for the work W as the test object are compared with the tracer gas measurement data for the non-defective work in the measuring step, and thereby, occurrence of fine leakage from the work as the test object is determined.

5 Claims, 2 Drawing Sheets

(56) References Cited

FOREIGN PATENT DOCUMENTS

WO      2013/143002 A1    10/2013
WO      2015/056661 A1    4/2015

OTHER PUBLICATIONS

International Preliminary Report On Patentability in corresponding International Application No. PCT/JP2020/034125, issued Mar. 7, 2023 (6 pages).

* cited by examiner

METHOD FOR LEAK TESTING

FIELD OF THE INVENTION

The present invention relates to a method for leak testing for detecting fine or micro leakage of a work as a test object using a tracer gas such as helium gas.

BACKGROUND OF THE INVENTION

A helium leak tester for detecting micro leakage of a small work such as a precision electronic component generally includes a hermetically sealed container for receiving the work, a suction device for vacuum suctioning the hermetically sealed container and a detector for detecting helium gas.

In the helium leak tester disclosed in the international patent application publication No. WO2015/56661, the hermetically sealed container has a double structure including an openable and closable chamber connected to the suction device and an openable and closable work capsule disposed in the chamber for receiving a work therein. A general outline of a method for leak testing with the helium leak tester is given below.

In a preparatory step, the work as a test object is subjected to helium bombing (the work is soaked in a pressurized helium gas for a predetermined length of time). If the work has a micro defect, the helium enters the work during the helium bombing.

Next, in a state where the chamber and the work capsule are open, the work that was subjected to the helium bombing is set in the work capsule. Then, in a state where the chamber is hermetically sealed and the work capsule is open, the chamber is vacuum suctioned by the suction device. When a predetermined degree of vacuum is attained, the work capsule is hermetically sealed and kept in that state for a predetermined length of time. If the work has a micro defect, the helium that penetrated into the work leaks out of the work and is accumulated in the work capsule. When the predetermined length of time has passed, the work capsule is opened to release the accumulated helium to the chamber at once, and an amount of the helium suctioned by the suction device is measured with a detector.

A measured quantity of the helium is divided by the predetermined length of time to obtain a quantity of leaked helium per unit time. The quantity of leaked helium per unit time is compared with a threshold value to determine whether a micro leakage occurs from the work or not.

SUMMARY OF THE INVENTION

Problem to be Solved By the Invention

When an enclosing material for hermetically sealing an inner space of a work as a test object at least partially includes a material that is permeable to helium such as quartz glass, the helium infiltrates the enclosing material in a helium bombing step. As a result, even if the work is non-defective (work without micro leakage), the helium infiltrated in the enclosing material is released in a measuring step. In the method for leak testing mentioned above, the released helium interferes with an accurate measurement of a fine or micro leakage attributable to a fine or micro defect of the work.

Means for Solving the Problems

To solve the problems mentioned above, the present invention provides a method for leak testing comprising a series of steps including: a gas bombing step, wherein a work as a test object is soaked in a pressurized tracer gas; a work setting step, wherein the work subjected to the gas bombing is set in a hermetically sealed container; a vacuum suctioning step, wherein the hermetically sealed container is vacuum suctioned by a suction device; a measuring step, wherein tracer gas measurement data are obtained by measuring a vacuum suctioned tracer gas with a detector, characterized in that the method further comprises a step of obtaining tracer gas measurement data for a non-defective work by performing the series of steps, the non-defective work having same specifications as the work as the test object, and that the measuring step comprises comparing the tracer gas measurement data for the work as the test object with the tracer gas measurement data for the non-defective work to determine whether the work as the test object has a fine leakage or not.

According to the method for leak testing given above, occurrence of the fine leakage can be determined from the work as the test object without being affected by the tracer gas that may also be released from the non-defective work.

The tracer gas measurement data for the non-defective work and the tracer gas measurement data for the work as the test object are measured quantities of the tracer gas per unit time.

An enclosing material hermetically sealing inner spaces of the non-defective work and the work as the test object comprises a material that permits infiltration of the tracer gas, wherein the measured quantity per unit time for the non-defective work includes a released quantity per unit time attributable to a release of the tracer gas that infiltrated into the enclosing material, and wherein if the work as the test object has a fine defect, the measured quantity per unit time for the work as the test object includes a released quantity per unit time attributable to the release of the tracer gas that infiltrated into the enclosing material and a leakage quantity per unit time attributable to the fine leakage through the fine defect.

Preferably, a range of detection for the fine defect of the work as the test object is set, wherein a principal measurement point of time is set at or after a point of time at which the leakage quantity per unit time attributable to the fine leakage of the work as the test object having the fine defect of a lower limit of the range of detection is equal to the measured quantity per unit time for the non-defective work, and wherein in the measuring step, the measured quantity per unit time for the work as the test object is compared with the measured quantity per unit time for the non-defective work at the principal measurement point of time.

According to the method given above, measurement is performed on the work as the test object having the fine defect of the lower limit of the range of detection at the principal measurement point of time after the released quantity per unit time attributable to the release of the tracer gas infiltrated in the enclosing material has attenuated. Thereby, the fine leakage attributable to the fine defect can be detected. Further, since the leakage quantity per unit time attributable to the fine leakage through the fine defect is not less than the released quantity per unit time attributable to the release from the enclosing material, presence or absence of the fine defect of the lower limit of the range of detection can be determined accurately.

More preferably, a secondary measurement point of time is set at or before a point of time at which the leakage quantity per unit time attributable to the fine leakage of the work as the test object having the fine defect of an upper limit of the range of detection is equal to the measured quantity per unit time for the non-defective work, and wherein in the measuring step, the measured quantity per unit time for the work as the test object is compared with the measured quantity per unit time for the non-defective work at the secondary measurement point of time.

According to the method given above, measurement is performed on the work as the test object having the fine defect of the upper limit of the range of detection at the secondary measurement point of time. Although the leakage quantity per unit time attributable to the fine leakage through the fine defect attenuates in a relatively short period of time, the fine leakage can be detected. Further, since the measured quantity per unit time attributable to the fine leakage through the fine defect is not less than the release quantity per unit time attributable to the release from the enclosing material, presence or absence of the fine defect of the upper limit of the range of detection can be determined accurately.

A range of detection for the fine defect of the work as the test object is set, wherein a principal measurement point of time is set in a period of time in which the leakage quantity per unit time attributable to the fine leakage through the fine defect of the work as the test object having the fine defect of a lower limit of the range of detection is not less than 0.2 times the measured quantity per unit time for the non-defective work, wherein a secondary measurement point of time is set in a period of time in which the leakage quantity per unit time attributable to the fine leakage through the fine defect of the work as the test object having the fine defect of an upper limit of the range of detection is not less than 0.2 times the measured quantity per unit time for the non-defective work, and wherein in the measuring step, the measured quantities per unit time for the work as the test object are respectively compared with the measured quantities per unit time for the non-defective work at the principal measurement point of time and the secondary measurement point of time.

According to the method given above, a determination can be made whether the work as the test object has the fine defect of the range of detection or not. Further, since the leakage quantity per unit time attributable to the fine leakage through the fine defect is not less than 0.2 times the released quantity per unit time attributable to the release from the enclosing material, the determination can be made accurately whether the work has the fine defect of the range of detection or not even if there are variations in measurement.

The tracer gas comprises helium gas and the enclosing material for the work comprises quartz glass.

Advantageous Effects of the Invention

According to the present invention, the determination can be made whether the fine leakage occurs from the work as the test object or not without being affected by the tracer gas that may also be released from the non-defective work.

DETAILED DESCRIPTION OF THE INVENTION

Figure 1:
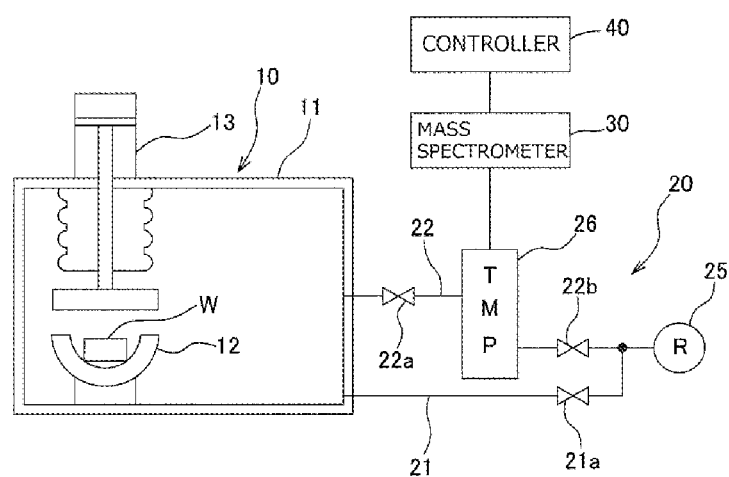
FIG. 1 is a schematic view of a configuration of a helium leak tester used in a method for leak testing according to one embodiment of the present invention.

One embodiment of the present invention will be described hereinafter with reference to the drawings. The helium leak tester schematically shown in FIG. 1 is used for determining whether a work W as a test object has a fine or micro defect. The work W of this embodiment is a small component such as a precision electronic component, a LED having an inner volume of 1.9 mm$^3$, for example. A part of an enclosing material hermetically sealing an inner space of the LED is made of quartz glass.

The helium leak tester includes a hermetically sealed container 10, a suction device 20, a mass spectrometer 30 (detector) and a controller 40 (controlling and processing unit).

The hermetically sealed container 10 of this embodiment includes a chamber 11 that is openable and closeable by a door or a lid (not shown) and a work capsule 12 that is disposed in the chamber 11 and openable and closeable, constituting a double structure. The work capsule 12 is opened or closed by an opening/closing mechanism 13 including an air cylinder.

The suction device 20 includes a first exhaust passage 21 and a second exhaust passage 22 that are connected to the chamber 11, a rotary pump 25 connected to a downstream end common to the first exhaust passage 21 and the second exhaust passage 22 and a turbo-molecular pump 26 disposed in a middle of the second exhaust passage 22.

The mass spectrometer 30 that can detect helium with a high sensitivity is connected to an upper tier of the turbo-molecular pump 26.

A valve 21a is disposed in the first exhaust passage 21. A valve 22a is disposed in the second exhaust passage 22 between the chamber 11 and the turbo-molecular pump 26. A valve 22b is disposed in the second exhaust passage 22 between the turbo-molecular pump 26 and the rotary pump 25.

A method for leak testing performed with the helium leak tester having the features mentioned above will be described hereinafter.

Obtaining Measured Data for a Non-Defective Work

Measured data for a non-defective work having same specifications as a work W as a test object are obtained preliminarily in the following steps:
(Helium Bombing Step: Gas Bombing Step)

Preliminarily, the non-defective work is subjected to helium gas (tracer gas) bombing (the non-defective work is soaked in a pressurized helium gas for a predetermined length of time). For example, the non-defective work is soaked in helium gas pressurized at 400 kPaG for an hour. The non-defective work has a hermetically sealed inner space. The helium gas does not penetrate into the inner space because the non-defective work does not have a defect. However, in this embodiment, the helium gas adheres to a surface of the work and, since an enclosing material of the work includes quartz glass, the helium gas infiltrates the quartz glass.
(Work Setting Step)

The door of the chamber 11 is opened and the work that was subjected to helium gas bombing is set in the work capsule 12 in an open state. Then, the door is closed to hermetically seal an inner space of the chamber 11.

Next, the following sequence controls and computations are performed by the controller 40. The rotary pump 25 and the turbo-molecular pump 26 are operating all the time.

(Vacuum Suctioning Step)

In the state where the chamber 11 is hermetically sealed and the work capsule 12 is left open, the valve 21a is opened to roughly exhaust an air inside the chamber 11 with the rotary pump 25. When a pressure detected by a pressure sensor (not shown) connected to the chamber 11 reaches a predetermined degree of vacuum, the valve 21a is closed and the valves 22a, 22b are opened. Thereby, the degree of vacuum inside the chamber 11 is enhanced by cooperation of the rotary pump 25 and the turbo-molecular pump 26.

(Measuring Step)

When the degree of vacuum inside the chamber 11 reaches a higher predetermined degree of vacuum, the opening/closing mechanism 13 is operated to hermetically seal the work capsule 12. The work capsule 12 is kept under the hermetically sealed condition for a predetermined length of time, for example, several seconds. During this period, the helium that adhered to the surface of the work and that was infiltrated in the quartz glass is released and accumulated in the work capsule 12.

When the predetermined length of time has passed, the opening/closing mechanism 13 is operated to open the work capsule 12. Thereby, the helium accumulated in the work capsule 12 is diffused in the chamber 11 at once and the helium is suctioned in a middle tier of the turbo-molecular pump 26. The mass spectrometer 30 connected to the upper tier of the turbo-molecular pump 26 detects the helium back-diffused from the middle tier of the turbo-molecular pump 26 to the mass spectrometer 30.

A quantity of the helium detected by the mass spectrometer 30 is divided by the predetermined length of time (accumulation time) to obtain a quantity of helium released from the non-defective work per unit time.

Figure 2:
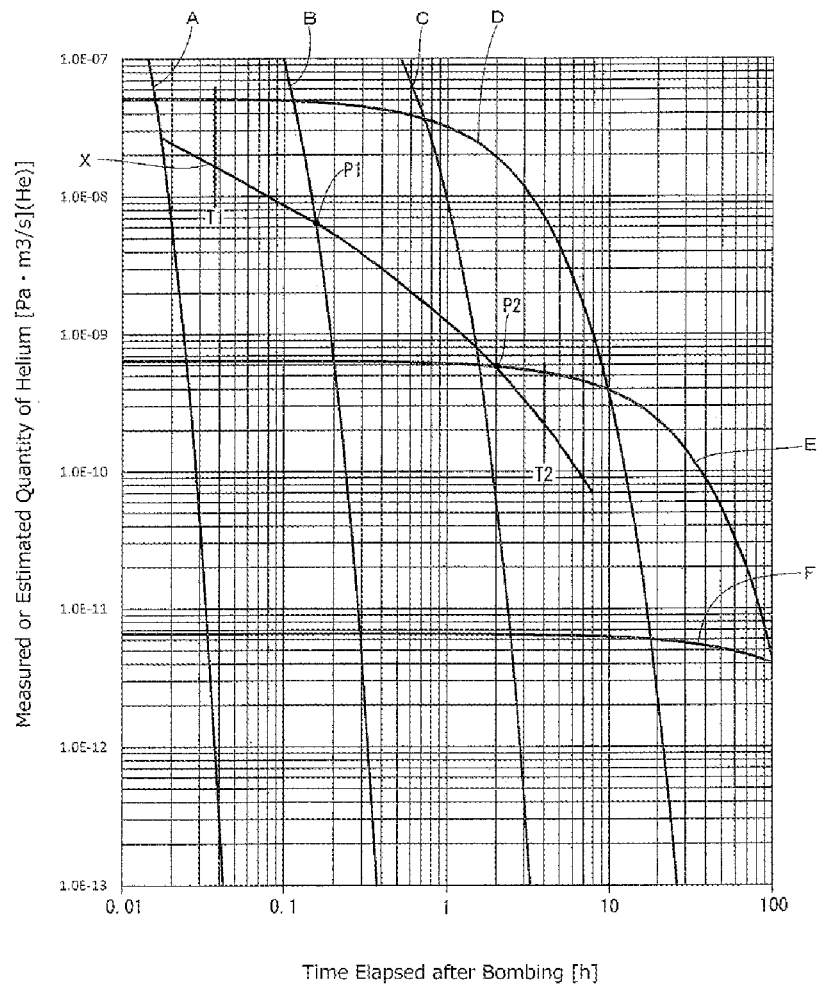
FIG. 2 is a double logarithmic graph showing a variation with time of a measured or estimated quantity of helium per unit time using the helium leak tester of FIG. 1. Curve X shows the variation with time of the actually measured quantity of helium per unit time for a non-defective work. Curves A to F respectively show estimated leakage quantities of helium per unit time attributable to micro leakages for works with micro defects of different dimensions.

In the measuring step, the measurement is done multiple times in a time course. Thereby, as indicated by Curve X of FIG. 2, data on variation with time of a measured quantity of helium per unit time are obtained for the non-defective work. Curve X is based on measurement data for a plurality of, three, for example, non-defective works. Elapsed time in FIG. 2 is an elapsed time from a termination time of the helium bombing. The measurement is started as soon as the termination time of the helium bombing, after one minute, for example.

As indicated by Curve X, the measured quantity of helium per unit time is reduced as time proceeds. The measured quantity initially includes a released quantity of helium adhered to the surface of the work and a released quantity of helium infiltrated in the quartz glass. As time proceeds, the measured quantity mainly includes the released quantity of helium infiltrated in the quartz glass.

Determining Measurement Time

Next, a time to measure a quantity of helium per unit time in the leak testing on the work W as the test object is determined. A method for determining the measurement time will be described with reference to FIG. 2.

In FIG. 2, Curves A, B, C, D, E and F respectively indicate variations with time of leakage quantities of helium per unit time for works having micro defects of different dimensions, i.e., works having micro defects that may respectively cause micro leakages of $10^{-5}$, $10^{-6}$, $10^{-7}$, $10^{-8}$, $10^{-9}$ and $10^{-10}$ Pam$^3$/s in an air-converted leakage quantity per unit time. Here, the leakage quantities are estimated quantities attributable only to the micro defects obtained by computer simulation. The leakage quantities may also be obtained by actually measured values.

In this embodiment, detection of micro defects that may cause air-converted leakage quantity of $10^{-6}$ to $10^{-9}$ Pam$^3$/s per unit time is intended. That is, an upper limit of a range of detection of the micro defect is a defect that may cause leakage of $10^{-6}$ Pam$^3$/s in air-converted leakage quantity (refer to Curve B of FIG. 2) and a lower limit of the range of detection of the micro defect is a defect that may cause leakage of $10^{-9}$ Pam$^3$/s in air-converted leakage quantity (refer to Curve E of FIG. 2).

Referring to FIG. 2, as indicated by Curve B, in the work with a leakage of the upper limit of the range of detection (air-converted leakage quantity of $10^{-6}$ Pam$^3$/s), initially a micro leakage quantity of helium per unit time attributable to the micro defect is greater than the quantity of released helium per unit time of the non-defective work. However, as time proceeds, the micro leakage quantity of helium per unit time attributable to the micro defect is reduced to be smaller than the quantity of released helium per unit time of the non-defective work.

An intersection point P1 between the Curve X for the non-defective work and the Curve B for the work with the leakage of the upper limit of the range of detection indicates that the micro leakage quantity of helium per unit time attributable to the micro defect of the upper limit of the range of detection is equal to the quantity of released helium per unit time of the non-defective work. That is, when the work with the leakage of the upper limit of the range of detection is measured, measured quantity per unit time (including both the micro leakage quantity and the released quantity per unit time) at a point of elapsed time of the intersection P1 is two times the measured quantity per unit time for the non-defective work.

The point of elapsed time at the intersection P1 is approximately 0.15 hour (approximately 9 minutes). Before the point of elapsed time at the intersection P1, the leakage quantity attributable to the micro defect of the work of the upper limit of the range of detection is greater than the measured quantity for the non-defective work. Therefore, a first measurement point of time T1 (secondary measurement point of time) is set at or before the point of elapsed time at the intersection P1. In this embodiment, the first measurement point of time T1 is set at approximately 0.035 hour (approximately 2 minutes), for example. In a case where the first measurement point of time T1 is set at 2 minutes, the leakage quantity attributable to the micro leakage from the work with the leakage of the upper limit of the range of detection is far greater than the measured quantity for the non-defective work.

As indicated by Curve E, in the work with the leakage of the lower limit of the range of detection (air-converted leakage quantity of $10^{-9}$ Pam$^3$/s), initially the leakage quantity of helium per unit time attributable to the micro defect is smaller than the measured quantity of helium per unit time for the non-defective work. However, as time proceeds, the leakage quantity of helium per unit time attributable to the micro defect becomes greater than the measured quantity per unit time for the non-defective work.

An intersection point P2 between the Curve X for the non-defective work and the Curve E for the work of the lower limit of the range of detection indicates that the leakage quantity per unit time attributable to the micro defect of the work of the lower limit of the range of detection is equal to the measured quantity per unit time for the non-defective work. That is, when the work with the leakage of the lower limit of the range of detection is measured, a measured quantity per unit time (including both the micro leakage quantity and the released quantity) at a point of elapsed time of the intersection P2 is two times the measured quantity per unit time for the non-defective work.

The elapsed time at the intersection P2 is approximately 2 hours. After the point of elapsed time at the intersection P2, the leakage quantity attributable to the micro defect of the work of the lower limit of the range of detection is greater than the measured quantity for the non-defective work. Therefore, a second measurement point of time T2 (principal measurement point of time) is set at or after the point of elapsed time at the intersection P2. In this embodiment, the second measurement point of time T2 is set at approximately 4 hours. In a case where the second measurement point of time T2 is set at 4 hours, the leakage quantity per unit time attributable to the micro defect of the work of the lower limit of the range of detection is several times greater than the measured quantity per unit time for the non-defective work.

Detecting Micro Defect of Work as a Test Object

After setting the measurement points of time T1, T2, determination is made whether the work W as the test object has a micro defect that may cause leakage within the range of detection by leak testing. The leak testing is performed in a same series of steps as those for the non-defective work mentioned above under same conditions. If the work W has a micro defect, the helium gas penetrates into the work W in the helium bombing step.

In the measuring step, a quantity of helium per unit time is measured at the first measurement point of time T1 and the second measurement point of time T2. As with the non-defective work, the measured quantity of helium Q includes a released quantity of helium Qx infiltrated in the quartz glass of the work W. Further, if the work W has a micro defect, a micro leakage quantity Qw of helium that leaked through the micro defect is added.

The controller 40 further makes a following determination in the measuring step. That is, the controller determines presence or absence of the micro defect by comparing the measured quantity of helium Q (Qx+Qw) at the first measurement point of time T1 with the measured quantity of helium Qx of the Curve X at the first measurement point of time T1. Various methods of comparison may be adopted. For example, if Q/Qx is not less than a predetermined threshold, 1.2, for example, a determination is made that the micro leakage occurs. For another example, if a ratio between (Q−Qx) and Qx is not less than a predetermined ratio, 0.2, for example, a determination is made that the micro leakage Qw occurs. In this way, the micro leakage caused by the micro defect can be detected accurately by substantially cancelling out the effect of the released quantity of helium Qx infiltrated in the quartz glass of the work W.

In a case of a work W with a leakage of the upper limit of the range of detection, i.e. air-converted leakage quantity of $10^{-6}$ Pam$^3$/s, as indicated by Curve B, the leakage quantity Qw is far greater than the released quantity Qx at the first measurement point of time T1, and the occurrence of the micro leakage can be determined. Further, in cases of works W with air-converted leakage quantities of $10^{-7}$ Pam$^3$/s and $10^{-8}$ Pam$^3$/s as respectively indicated by Curves C and D of FIG. 2, the micro leakage quantities Qw are greater than the released quantities Qx, and the occurrence of the micro leakage can be determined.

As is clear from Curve A of FIG. 2, a micro leakage from a work W with a micro defect that may cause a leakage greater than the upper limit of the range of detection (air-converted leakage quantity of $10^{-5}$ Pam$^3$/s) cannot be detected at the first measurement point of time T1. It is because helium has already been generally exhausted from an inner space of the work W by the first measurement point of time T1. The micro leakage from the work W with the micro defect that may cause a leakage greater than the upper limit of the range of detection can be detected with an air leak tester that is provided with the helium leak tester.

Further, as is indicated by Curve E, a micro leakage from a work W with a leakage of the lower limit of the range of detection (air-converted leakage quantity of $10^{-9}$ Pam$^3$/s) cannot be detected at the first measurement point of time T1 because the micro leakage quantity Qw is far smaller than the released quantity Qx.

The controller 40 further determines occurrence of a micro leakage by comparing the measured quantity of helium per unit time at the second measurement point of time T2 with the released quantity of helium Qx of Curve X at the second measurement point of time T2. In a case of a work W with a leakage quantity Qw of the lower limit of the range of detection (air-converted leakage quantity of $10^{-9}$ Pam$^3$/s), as indicated by Curve E of FIG. 2, the micro leakage quantity Qw of the measured quantity of helium Q is several times greater than the released quantity Qx at the second measurement point of time T2. Therefore, the occurrence of the micro leakage can be determined by comparing the measured quantity Q and the released quantity Qx in a similar manner as described above. Further, in a case of a work W with an air-converted leakage quantity of $10^{-8}$ Pam$^3$/s (refer to Curve D), the occurrence of the micro leakage can also be determined.

At the second measurement point of time T2, micro leakage cannot be detected from works W with leakage quantities that do not fall within the range of detection, i.e. air-converted leakage quantities of $10^{-5}$ Pam$^3$/s and $10^{-10}$ Pam$^3$/s. Moreover, for works W with air-converted leakage quantities of $10^{-6}$ Pam$^3$/s and $10^{-7}$ Pam$^3$/s, micro leakage cannot be detected although the leakage quantities fall within the range of detection. It is because the micro leakage quantity Qw is smaller than the released quantity Qx.

As mentioned above, a micro leakage from a work W with leakage of $10^{-6}$ Pam$^3$/s, $10^{-7}$ Pam$^3$/s and $10^{-8}$ Pam$^3$/s in air-converted leakage quantity can be detected from the measured quantities at the first measurement point of time T1 and a micro leakage from a work W with leakage of $10^{-8}$ Pam$^3$/s and $10^{-9}$ Pam$^3$/s in air-converted leakage quantity can be detected from the measured quantities at the second measurement point of time T2.

When a micro leakage is detected either at the first measurement point of time T1 or at the second measurement point of time T2, the controller 40 determines that the work W is defective with a micro defect. When a micro leakage is not detected at the first measurement point of time T1 or at the second measurement point of time T2, the controller 40 determines that the work W is non-defective without a micro defect.

If the controller 40 determines that a micro leakage occurs from the work W at the first measurement point of time T1, the leak testing may be ended before the second measurement point of time T2.

The helium leak tester of this embodiment is provided with an air leak tester. The air leak tester can detect leakage greater than air-converted leakage quantity of $10^{-6}$ $Pam^3/s$ per unit time caused by a micro defect. Therefore, micro defects that may cause leakage of a wide range can be detected by cooperation of the helium leak tester and the air leak tester.

The second measurement point of time T2 may be shifted to a point of time later than the one in this embodiment. If the second measurement point of time T2 is set at the point of time at the intersection of Curve X and Curve F or later, even a micro defect of a work that may cause leakage of $10^{-10}$ $Pam^3/s$ in air-converted leakage quantity can be detected.

In this embodiment, the measurement points of time T1, T2 are set in a period of time in which the leakage quantities per unit time from the works with the micro defects of the upper and lower limits of the range of detection are respectively not less than the measured quantities per unit time of the leakages from the non-defective work. Alternatively, the measurement points of time T1, T2 may be set in a period of time in which the leakage quantities per unit time from the work with the micro defects of the upper and lower limits of the range of detection are respectively not less than 0.2 times the measured quantities per unit time of the leakages from the non-defective work.

The present invention is not limited to the embodiment described above. Various modifications may be made without departing from the scope and spirit of the invention.

In the embodiment described above, the accumulation time for the work capsule may be used as the unit time.

The hermetically sealed container may not have a double structure, being composed of the work capsule alone. In this case, the suction device is connected to the work capsule.

Three or more measurement points of time may be set.

The tracer gas is not limited to helium. Hydrogen or argon may also be used as a tracer gas.

INDUSTRIAL APPLICABILITY

The present invention is applicable to a method for leak testing using a tracer gas such as helium gas.

The invention claimed is:

1. A method for leak testing comprising a series of steps including:
    a gas bombing step, wherein a work as a test object is soaked in a pressurized tracer gas;
    a work setting step, wherein the work subjected to the gas bombing is set in a hermetically sealed container;
    a vacuum suctioning step, wherein the hermetically sealed container is vacuum suctioned by a suction device;
    a measuring step, wherein tracer gas measurement data are obtained by measuring a vacuum suctioned tracer gas with a detector,
    wherein the method further comprises a step of obtaining tracer gas measurement data for a non-defective work by performing the series of steps, the non-defective work having same specifications as the work as the test object;
    wherein the measuring step comprises comparing the tracer gas measurement data for the work as the test object with the tracer gas measurement data for the non-defective work to determine whether the work as the test object has a fine leakage or not;
    wherein the tracer gas measurement data for the non-defective work and the tracer gas measurement data for the work as the test object are measured quantities of the tracer gas per unit time;
    wherein an enclosing material hermetically sealing an inner space of the non-defective work and an inner space of the work as the test object comprises a material that permits infiltration of the tracer gas;
    wherein the measured quantity per unit time for the non-defective work includes a released quantity per unit time attributable to a release of the tracer gas that infiltrated into the enclosing material;
    wherein if the work as the test object has a fine defect, the measured quantity per unit time for the work as the test object includes a released quantity per unit time attributable to the release of the tracer gas that infiltrated into the enclosing material and a leakage quantity per unit time attributable to the fine leakage through the fine defect;
    wherein a range of detection for the fine defect of the work as the test object is set;
    wherein a principal measurement point of time is set in a period of time in which the leakage quantity per unit time attributable to the fine leakage of the work as the test object having the fine defect of a lower limit of the range of detection is not less than 0.2 times the measured quantity per unit time for the non-defective work; and
    wherein in the measuring step, the measured quantity per unit time for the work as the test object is compared with the measured quantity per unit time for the non-defective work at the principal measurement point of time.

2. The method for leak testing according to claim 1, wherein the principal measurement point of time is set at or after a point of time at which the leakage quantity per unit time attributable to the fine leakage of the work as the test object having the fine defect of a lower limit of the range of detection is equal to the measured quantity per unit time for the non-defective work.

3. The method for leak testing according to claim 2, wherein a secondary measurement point of time is set at or before a point of time at which the leakage quantity per unit time attributable to the fine leakage of the work as the test object having the fine defect of an upper limit of the range of detection is equal to the measured quantity per unit time for the non-defective work, and
    wherein in the measuring step, the measured quantity per unit time for the work as the test object is compared with the measured quantity per unit time for the non-defective work at the secondary measurement point of time.

4. The method for leak testing according to claim 1, wherein a secondary measurement point of time is set in a period of time in which the leakage quantity per unit time attributable to the fine leakage through the fine defect of the work as the test object having the fine defect of an upper limit of the range of detection is not less than 0.2 times the measured quantity per unit time for the non-defective work, and
    wherein in the measuring step, the measured quantity per unit time for the work as the test object is compared with the measured quantity per unit time for the non-defective work at the secondary measurement point of time.

5. The method for leak testing according to claim 1, wherein the tracer gas comprises helium gas and the enclosing material for the work comprises quartz glass.

* * * * *